(12) United States Patent
Lee et al.

(10) Patent No.: US 7,764,399 B2
(45) Date of Patent: Jul. 27, 2010

(54) IMAGE PROCESSING APPARATUS AND METHOD OF THE SAME

(75) Inventors: Hsin-Hung Lee, Tao Yuan Shien (TW); Yin-Cheng Liu, Tao Yuan Shien (TW); Yu-Hsiang Huang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 914 days.

(21) Appl. No.: 11/595,661

(22) Filed: Nov. 10, 2006

(65) Prior Publication Data

US 2007/0223067 A1    Sep. 27, 2007

(30) Foreign Application Priority Data

Mar. 22, 2006    (TW) .............................. 95109751 A

(51) Int. Cl.
    G03F 3/08    (2006.01)
(52) U.S. Cl. ....................... 358/1.9; 358/3.23; 358/520; 358/523
(58) Field of Classification Search ................. 358/500, 358/501, 518, 520, 523, 1.9, 3.23; 382/162, 382/167
See application file for complete search history.

(56) References Cited

U.S. PATENT DOCUMENTS

| | | | | |
|---|---|---|---|---|
| 6,868,179 B2 * | 3/2005 | Gruzdev et al. | ............. | 382/167 |
| 7,193,659 B2 * | 3/2007 | Huang et al. | ................ | 348/649 |
| 7,215,366 B2 * | 5/2007 | Mori et al. | ................ | 348/223.1 |
| 7,224,833 B2 * | 5/2007 | Johannesson et al. | ....... | 382/167 |
| 7,433,104 B2 * | 10/2008 | Cheo et al. | .................... | 358/520 |
| 7,518,617 B2 * | 4/2009 | Lee et al. | .................... | 345/601 |
| 2004/0120576 A1 * | 6/2004 | Kim | ........................... | 382/167 |
| 2006/0285768 A1 * | 12/2006 | Chen | .......................... | 382/274 |

FOREIGN PATENT DOCUMENTS

| | | |
|---|---|---|
| JP | 2000-92337 | 9/1998 |
| JP | 2001-218078 | 8/2000 |
| JP | 2003-37745 | 7/2001 |
| JP | 2003-110868 | 10/2001 |
| JP | 2005-295294 | 4/2004 |

* cited by examiner

Primary Examiner—Thomas D Lee
(74) Attorney, Agent, or Firm—Thomas, Kayden, Horstemeyer & Risley

(57) ABSTRACT

The invention discloses an image processing apparatus for adjusting the saturation of an input image. The input image also has lightness and hue. The image processing apparatus includes a first processing unit, a second processing unit, a third processing unit, and a converter. According to the lightness, hue, and a first LUT, the first processing unit determines a gain curve. According to the lightness, hue, and a second LUT, the second processing unit determines a normalized limit gain and multiplies the normalized limit gain by the saturation of the input image to generate a normalized saturation. According to the gain curve and a third LUT, the third processing unit determines a set of gain parameters and, according to the normalized saturation and the gain parameters, determines a gain of saturation. According to the gain of saturation, the converter is used for adjusting the saturation of the input image.

30 Claims, 10 Drawing Sheets

| Lightness (L) | 0 | 1 | 2 | ... | 98 | 99 |
|---|---|---|---|---|---|---|
| Gain-L | G-L0 | G-L1 | G-L2 | | G-L98 | G-L99 |

| Hue (H) | 0 | 1 | 2 | ... | 358 | 359 |
|---|---|---|---|---|---|---|
| Gain-H | G-H0 | G-H1 | G-H2 | | G-H358 | G-H359 |

Lightness (L)=37    Lightness (L)=59    Lightness (L)=85

420
| L \ H | H₀ | H₁ | H₂ |
|---|---|---|---|
| L₀ | LG_nor₀₀ | LG_nor₁₀ | LG_nor₂₀ |
| L₁ | LG_nor₀₁ | LG_nor₁₁ | LG_nor₂₁ |
| L₂ | LG_nor₀₂ | LG_nor₁₂ | LG_nor₂₂ |
FIG. 7
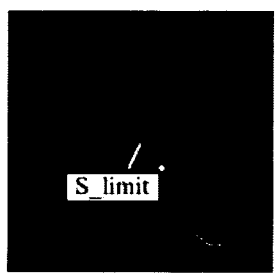  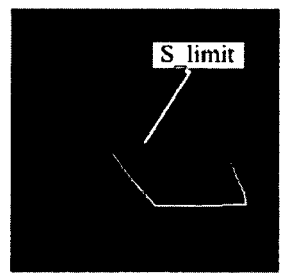  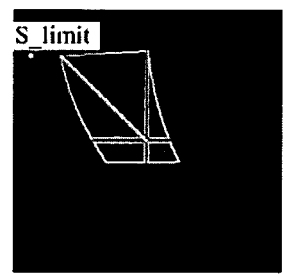
Lightness (L)=37    Lightness (L)=59    Lightness (L)=85
FIG. 8

440

| | $G_1$ | $G_2$ | $G_3$ |
|---|---|---|---|
| $GC_{00}$ | 0.94 | 1.1 | 1.02 |
| $GC_{01}$ | 0.96 | 1.08 | 1 |
| $GC_{02}$ | 0.98 | 1.1 | 0.94 |
| $GC_{10}$ | 1 | 1.18 | 0.82 |
| $GC_{11}$ | 1.02 | 1.16 | 0.8 |
| $GC_{12}$ | 1.04 | 1.14 | 0.78 |
| $GC_{20}$ | 1.06 | 1.12 | 0.76 |
| $GC_{21}$ | 1.08 | 1.1 | 0.74 |
| $GC_{22}$ | 1.1 | 1.08 | 0.72 |

440'

| | $G_0$ | $G_1$ | $G_2$ | ... | $G_n$ |
|---|---|---|---|---|---|
| $GC_{00}$ | 0.94 | 1.1 | 1.02 | ... | 0.72 |
| $GC_{01}$ | 0.96 | 1.08 | 1 | ... | 0.74 |
| $GC_{02}$ | 0.98 | 1.1 | 0.94 | ... | 0.76 |
| $GC_{10}$ | 1 | 1.18 | 0.82 | ... | 0.78 |
| $GC_{11}$ | 1.02 | 1.16 | 0.8 | ... | 0.8 |
| $GC_{12}$ | 1.04 | 1.14 | 0.78 | ... | 0.82 |
| $GC_{20}$ | 1.06 | 1.12 | 0.76 | ... | 0.94 |
| $GC_{21}$ | 1.08 | 1.1 | 0.74 | ... | 1 |
| $GC_{22}$ | 1.1 | 1.08 | 0.72 | ... | 1.02 |

440"

| | a | $G_0$ |
|---|---|---|
| $GC_{00}$ | 1.08 | 0.94 |
| $GC_{01}$ | 1.1 | 0.96 |
| $GC_{02}$ | 1.12 | 0.98 |
| $GC_{10}$ | 1.14 | 1 |
| $GC_{11}$ | 1.16 | 1.02 |
| $GC_{12}$ | 1.18 | 1.04 |
| $GC_{20}$ | 1.1 | 1.06 |
| $GC_{21}$ | 1.08 | 1.08 |
| $GC_{22}$ | 1.1 | 1.1 |

IMAGE PROCESSING APPARATUS AND METHOD OF THE SAME

BACKGROUND OF THE INVENTION

1. Field of the Invention

The present invention relates to an image processing apparatus and a method of the same for adjusting the saturation of an input image in a display system.

2. Description of the Prior Art

In current displays, all users can adjust color saturations via an On Screen Display for enhancing displaying effects of images. Referring to FIG. 1 through FIG. 2B, FIG. 1 is a functional block diagram of an image processing apparatus 1 according to prior art; FIG. 2A is a schematic diagram of the lightness gain look-up table 160a shown in FIG. 1, and FIG. 2B is a schematic diagram of the hue gain look-up table 160b shown in FIG. 1. The image processing apparatus 1 includes a first color space converter 10, a hue converter 12, a first saturation converter 14, processing units 16a and 16b, multipliers 18a and 18b, a second saturation converter 20, and a second color space converter 22. The processing unit 16a stores a lightness gain look-up table 160a, as shown in FIG. 2A. The processing unit 16b stores a hue gain look-up table 160b, as shown in FIG. 2B.

The first color space converter 10 is used for converting an input image from RGB color space into Lab color space, wherein L is a lightness component, and a and b are respective color components. The hue converter 12 is used for converting the two color components a and b into a hue (H) of the input image, wherein the hue (H) is defined as $H=\tan^{-1}(b/a)$. The first saturation converter 14 is used for converting the two color components a and b into a saturation (S) of the input image, wherein the saturation (S) is defined as $S=\sqrt{a^2+b^2}$.

The processing unit 16a decides a lightness gain Gain-L in accordance with the lightness (L) of an input image and the lightness gain look-up table 160a. The processing unit 16b further decides a hue gain Gain-H in accordance with the hue of the input image and the hue gain look-up table 160b. Then, the multiplier 18a multiplies the lightness gain Gain-L by the hue gain Gain-H to generate a saturation gain Gain-S. Afterwards, the multiplier 18b multiplies the saturation gain Gain-S by the saturation of the input image to generate an adjusted saturation.

The second saturation converter 20 is used for converting the adjusted saturation into the two color components a and b, and the second color space converter 22 then converts the input image from Lab color space into RGB color space.

Referring to FIG. 3A and FIG. 3B, FIG. 3A is a schematic diagram of Lab color space, and FIG. 3B is a schematic diagram of the saturation with different lightness and hues in Lab color space. As shown in FIG. 3A, in the Lab color space, the lightness (L) is controlled by heights, the hue (H) is controlled by angles, and the saturation (S) is controlled by radii. According to the previous description, the image processing apparatus 1 of prior art uses the lightness gain Gain-L and the hue gain Gain-H, respectively, to adjust the saturation of the input image. However, as shown in FIG. 3B, when the lightness of the input image is different, the range of hue saturation of the input image is also different. Because each of the sections with different lightness in the color space is distinct from others, and different hues (angles) have different ranges of saturation, selecting the lightness gain Gain-L in accordance with different lightness and selecting the hue gain Gain-H in accordance with different hues will cause the saturation to be uncontrollable and lead to color deviations.

Accordingly, the scope of the present invention is to provide an image processing apparatus and a method of the same to resolve the problems described above.

SUMMARY OF THE INVENTION

A scope of the invention is to provide an image processing apparatus and a method of the same. The image processing apparatus adjusts the saturation of an input image in accordance with the lightness and the hue of the input image simultaneously. By using the invention, better image quality can be achieved.

According to a preferred embodiment of the invention, the image processing apparatus according to the invention is used for adjusting a saturation of an input image which also includes lightness and hue. The image processing apparatus includes a first processing unit, a second processing unit, a third processing unit, and a first converter. The third processing unit is respectively coupled to the first processing unit and the second processing unit.

According to the embodiment described above, the first processing unit stores a first look-up table and decides a gain curve in accordance with the lightness and hue of the input image and the first look-up table. The second processing unit, storing a second look-up table, decides a normalized limit gain in accordance with the lightness and the hue of the input image and the second look-up table, and multiplies the saturation of the input image by the normalized limit gain to generate a normalized saturation. The third processing unit, storing a third look-up table, decides a set of gain parameters in accordance with the gain curve and the third look-up table, and further decides a saturation gain in accordance with the normalized saturation and the set of gain parameters. Afterwards, the first converter adjusts the saturation of the input image according to the saturation gain.

Accordingly, the image processing apparatus according the invention limits, in accordance with the lightness and the hue of the input image simultaneously, the processing of the maximum saturation, so as to prevent the occurrence of defects of hue deviation during the process of adjusting image coloring; therefore, better image quality can be achieved.

The advantage and spirit of the invention may be understood by the following recitations together with the appended drawings.

BRIEF DESCRIPTION OF THE APPENDED DRAWINGS

FIG. 7 is a schematic diagram of the second look-up table shown in FIG. 4.

FIG. 8 is a diagram showing saturation limit values corresponding to specific lightness and specific hues.

DETAILED DESCRIPTION OF THE INVENTION

Figure 1:
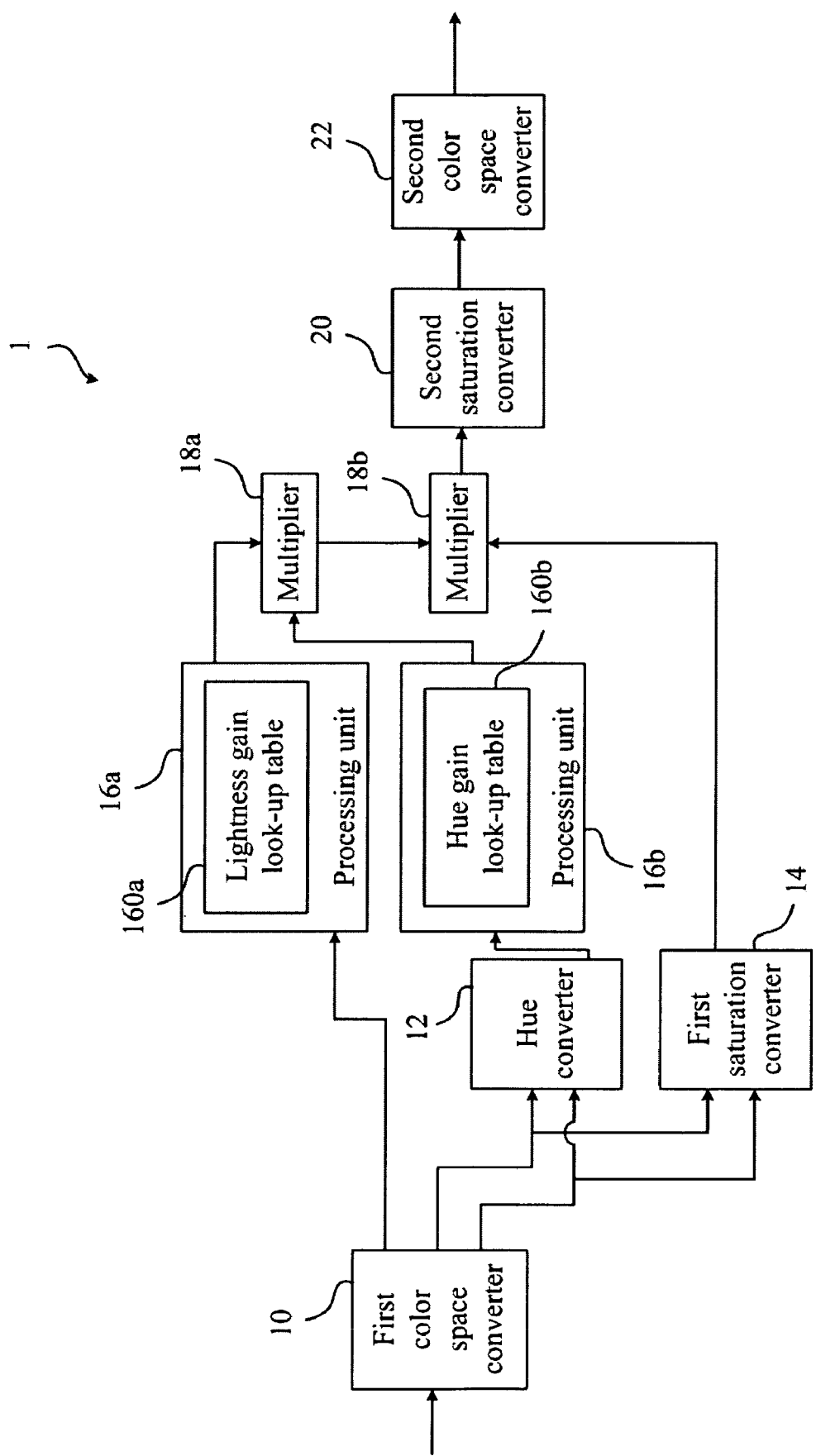
FIG. 1 is a functional block diagram of an image processing apparatus according to prior art.
Figure 2A:
FIG. 2A is a schematic diagram of the lightness gain look-up table shown in FIG. 1.
Figure 2B:
FIG. 2B is a schematic diagram of the hue gain look-up table shown in FIG. 1.
Figure 3A:
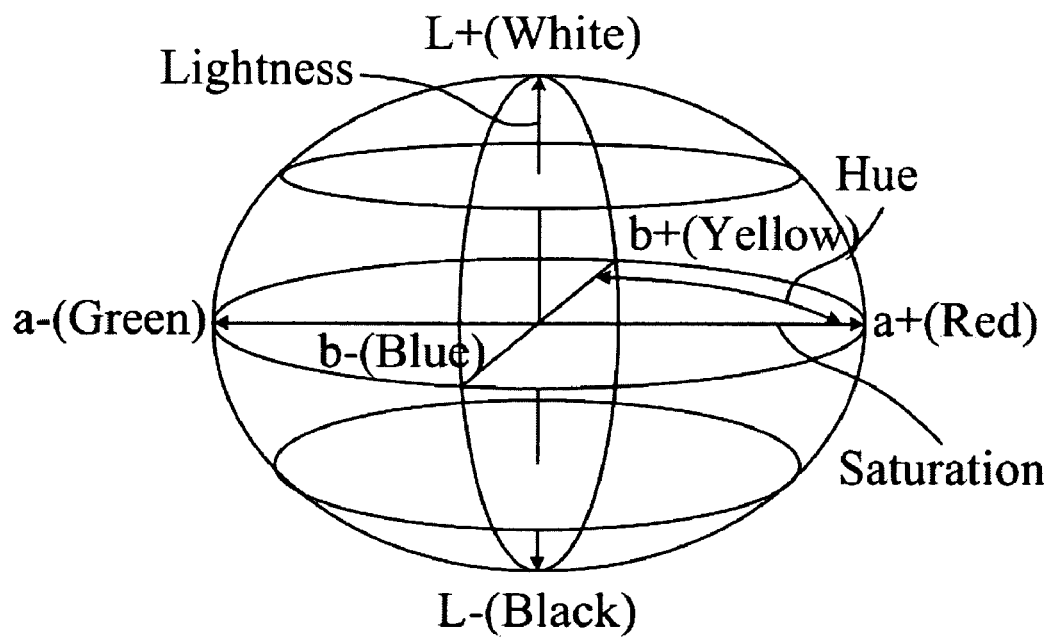
FIG. 3A is a schematic diagram of Lab color space.
Figure 3B:
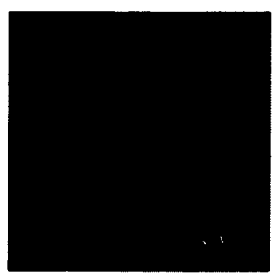
FIG. 3B is schematic diagram of the saturation with different lightness and hues in Lab color space.
Figure 3B:
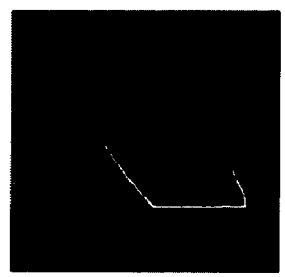
Figure 3B:
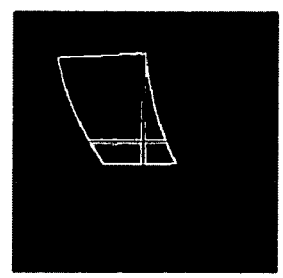
Figure 4:
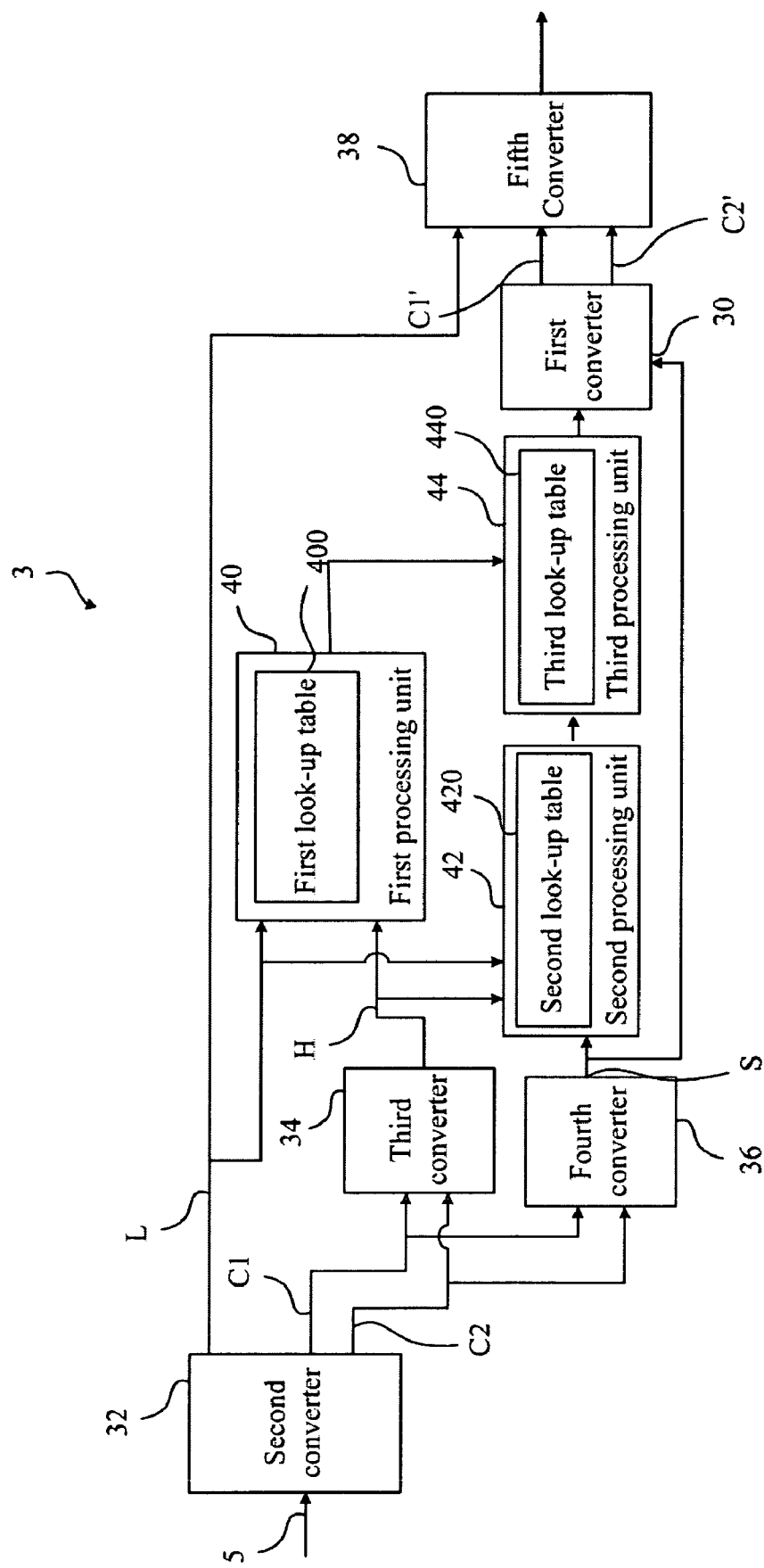
FIG. 4 is a functional block diagram of an image processing apparatus according to the first preferred embodiment of the invention.

Referring to FIG. 4, FIG. 4 is a functional block diagram of an image processing apparatus 3 according to the first preferred embodiment of the invention. In this embodiment, the image processing apparatus 3 is used for adjusting the saturation (S) of an input image 5. The input image 5 has lightness (L) and hue (H). In this embodiment, the input image 5 is in compliance with RGB color space (the first color space).

As shown in FIG. 4, the image processing apparatus 3 includes a first converter 30, a second converter 32, a third converter 34, a fourth converter 36, a fifth converter 38, a first processing unit 40, a second processing unit 42, and a third processing unit 44. The third processing unit 44 is respectively coupled to the first processing unit 40 and the second processing unit 42. The second converter 32 is coupled to the first processing unit 40. The third converter 34 is respectively coupled to the second converter 32, the first processing unit 40, and the second processing unit 42. The fourth converter 36 is respectively coupled to the first converter 30, the second converter 32, and the second processing unit 42. The fifth converter 38 is respectively coupled to the first converter 30 and the second converter 32.

Figures 5, 6:
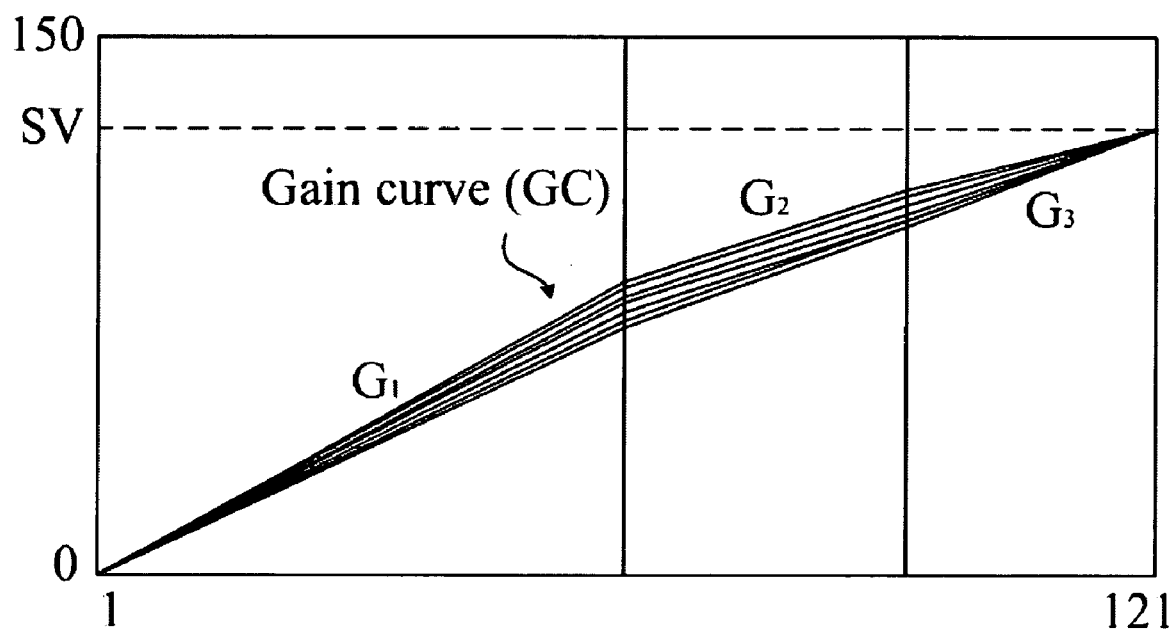
FIG. 5 is a schematic diagram of the first look-up table shown in FIG. 4.
FIG. 6 is a schematic diagram of gain curves in FIG. 5.

Referring to FIG. 5 and FIG. 6, FIG. 5 is a schematic diagram of the first look-up table 400 shown in FIG. 4, and FIG. 6 is a schematic diagram of gain curves (GC) shown in FIG. 5. The first processing unit 40 stores a first look-up table 400. As shown in FIG. 5, the first look-up table 400 records a plurality of lightness (L), a plurality of hues (H), and a plurality of gain curves (GC) which each respectively corresponds to one of the lightness (L) and one of the hues (H). A plurality of sets of gain parameters can be obtained in accordance with each gain curve (GC). Each set of gain parameters respectively includes a first gain $G_1$, a second gain $G_2$, and a third gain $G_3$, as shown in FIG. 6. In FIG. 6, the vertical axis and the horizontal axis respectively represent the output value and the input value of saturation.

Referring to FIG. 7, FIG. 7 is a schematic diagram of the second look-up table 420 shown in FIG. 4. The second processing unit 42 stores a second look-up table 420. As shown in FIG. 7, the second look-up table 420 records a plurality of lightness (L), a plurality of hues (H), and a plurality pf normalized limit gains LG_nor which each respectively corresponds to one of the lightness (L) and one of the hues (H).

The normalized limit gains LG_nor described above are calculated using the following formula:

$$LG\_nor = \frac{SV}{S\_limit},$$

wherein SV represents a sampling value associated with the gain curve (as shown in FIG. 6), and S_limit represents a saturation limit value obtained based on a specific lightness and a specific hue. Referring to FIG. 8, FIG. 8 is a diagram showing the saturation limit values corresponding to specific lightness and specific hues. It should be noted that the calculation method of the saturation limits value can be easily achieved by one skilled in the art, so the details are not further described.

Figure 9:
FIG. 9 is a schematic diagram of the third look-up table shown in FIG. 4.

Referring to FIG. 9, FIG. 9 is a schematic diagram of the third look-up table 440 shown in FIG. 4. The third processing unit 44 stores a third look-up table 440. As shown in FIG. 9, the third look-up table 440 records a plurality of gain curves (GC) and a plurality of sets of gain parameters which each respectively corresponds to one of the gain curves (GC).

It should be noted that the first look-up table 400, the second look-up table 420, and the third look-up table 440 described above can have different settings in accordance with different applications.

Referring to FIG. 4 again, in the embodiment described above, the second converter 32 is used for converting the input image 5 from the RGB color space (the first color space) into the second color space with separated lightness and colors, wherein the second color space is one selected from a group consisting a YCbCr color space, a Yuv color space, a YIQ color space, a CIELab color space, and an Luv color space, and the second color space defines a lightness component Y and color components (C1) and (C2). The third converter 34 is used for converting the color components (C1) and (C2) into the hue (H), wherein the hue (H) is defined as $H=\tan^{-1}(C1/C2)$. The fourth converter 36 is used for converting the color components (C1) and (C2) into the saturation (S), wherein the saturation (S) is defined as $S=\sqrt{C1^2+C2^2}$.

The first processing unit 40 is used for deciding a gain curve (GC) in accordance with the lightness (L) and the hue (H) of the input image 5 and the first look-up table 400. For example, if the lightness and the hue of the input image 5 are $L_2$ and $H_1$ respectively, the first processing unit 40 decides the gain curve is $GC_{12}$ in accordance with the first look-up table 400.

The second processing unit 42 is used for deciding a normalized limit gain LG_nor, in accordance with the lightness (L) and the hue (H) of the input image 5 and the second look-up table 420, and for multiplying the saturation (S) of the input image 5 by the normalized limit gain LG_nor to generate a normalized saturation S_nor. That is, S_nor=S*LG_nor. For example, if the lightness and the hue of the input image 5 are $L_2$ and $H_1$ respectively, the second processing unit 42 decides that the normalized limit gain is $LG\_nor_{12}$ in accordance with the second look-up table 420, and it multiplies the saturation (S) of the input image 5 by the normalized limit gain $LG\_nor_{12}$ to generate a normalized saturation S_nor. That is, $S\_nor=S*LG\_nor_{12}$.

The third processing unit 44 is used for deciding a set of gain parameters ($G_1$, $G_2$, $G_3$), in accordance with the gain curve (GC) and the third look-up table 440, and for deciding a saturation gain S_gain in accordance with the normalized saturation S_nor and the set of gain parameters. For example, if the gain curve is $GC_{12}$, the third processing unit 44 decides that the gain parameters ($G_1$, $G_2$, $G_3$) are (1.04, 1.14, 0.78) in accordance with the third look-up table 440, and it further decides a saturation gain S_gain in accordance with the normalized gain S_nor and the set of gain parameters. The saturation gain S_gain is calculated using the following formula:

$$S\_gain = \frac{S\_out}{S\_nor},$$

$$S\_out = S_1 * G_1 + S_2 * G_2 + S_3 * G_3, \text{ and}$$

-continued $$\begin{cases} S\_nor \leq T_1 \Rightarrow S_1 = S\_nor & S_2 = 0 & S_3 = 0 \\ T_1 < S\_nor \leq T_2 \Rightarrow S_1 = T_1 & S_2 = S\_nor - T_1 & S_3 = 0 \\ S\_nor > T_2 \Rightarrow S_1 = T_1 & S_2 = T_2 - T_1 & S_3 = S\_nor - T_2 \end{cases}.$$

wherein $T_1$ represents a first threshold, and $T_2$ represents a second threshold.

For example, if the normalized saturation S_nor is 100, the $T_1$ is set at 64, and $T_2$ is set at 96, then $S_1$=64, $S_2$=32, and $S_3$=4. Because ($G_1$, $G_2$, $G_3$) are (1.04, 1.14, 0.78), S_out=64*1.04+32*1.14+4*0.78. That is, S_out=106.16. Therefore, the saturation gain S_gain is 1.0616.

Subsequently, the first converter 30 first converts the saturation (S) into the two intermediate color components (C1") and (C2") and multiplies the two intermediate color components (C1") and (C2") respectively by the saturation gain S_gain to obtain the two adjusted color components (C1') and (C2'). In another preferred embodiment, the first converter 30 can first multiply the saturation (S) by the saturation gain S_gain, and then converts the adjusted saturation into the two adjusted color components (C1') and (C2'). By doing this, the adjustment of the saturation of the input image 5 is completed. Finally, the fifth converter 38 converts the input image 5 from the second color space (such as a YCbCr color space, a Yuv color space, a YIQ color space, a CIELab color space, or an Luv color space) into a first color space (such as an RGB color space). Because the saturation (S) of the input image 5 is adjusted in accordance with the lightness (L) and the hue (H) of the input image 5 simultaneously, the color saturation of the input image 5 can be substantially improved and leads to better image quality.

Figure 10:
FIG. 10 is a schematic diagram of the third look-up table according to the second preferred embodiment of the invention.

Referring to FIG. 10, FIG. 10 is a schematic diagram of the third look-up table 440' according to a second preferred embodiment of the invention. The major difference between the second embodiment and the first embodiment is that each of the gain curves according to the second embodiment is respectively a polynomial function, and each set of gain parameters respectively includes n+1 coefficients $G_0$~$G_n$, as shown in FIG. 10. In this embodiment, the saturation gain S_gain is calculated using the following formula:

$$S\_gain = \frac{S\_out}{S\_nor},$$

$$S\_out = G_0 + G_1 * S + G_2 * S^2 + \Lambda + G_n * S^n$$

(a polynomial function of a gain curve), wherein S_nor represents the normalized saturation, and S represents the saturation of the input image.

For example, if the gain curve is $GC_{10}$, the third processing unit 44 decides that the gain parameters (G0, G1, G2, . . . , Gn) are (1, 1.18, 0.82, . . . , 0.78) in accordance with the third look-up table 440' and further decides that the polynomial function of the gain curve is S_out=1+1.18*S+0.82*$S^2$+Λ+ 0.78*$S^n$.

Figure 11:
FIG. 11 is a schematic diagram of the third look-up table according to the third preferred embodiment of the invention.

Referring to FIG. 11, FIG. 11 is a schematic diagram of the third look-up table 440' according to the third preferred embodiment of the invention. The major difference between the third embodiment and the first embodiment is that each of the gain curves according to the third embodiment is respectively an exponential function, and each set of gain parameters respectively includes a base number a and an exponent $G_0$, as shown in FIG. 11. In this embodiment, the saturation gain S_gain is calculated using the following formula:

$$S\_gain = \frac{S\_out}{S\_nor},$$

$$S\_out = a^{G_0} \text{ (an exponential function of a gain curve),}$$

wherein S_nor represents a normalized saturation.

For example, if the gain curve is $GC_{21}$, the third processing unit 44 decides that (a, $G_0$) are (1.08, 1.08) in accordance with the third look-up table 440", and it further decides that the exponential function of the gain curve is:

$$S\_out=(1.08)^{1.08}.$$

In other words, the gain curve according to the invention can be designed by a designer as a look-up table, a linear function, a polynomial function, an exponential function, other correlation functions, or a combined application of the previously described functions.

Figure 12:
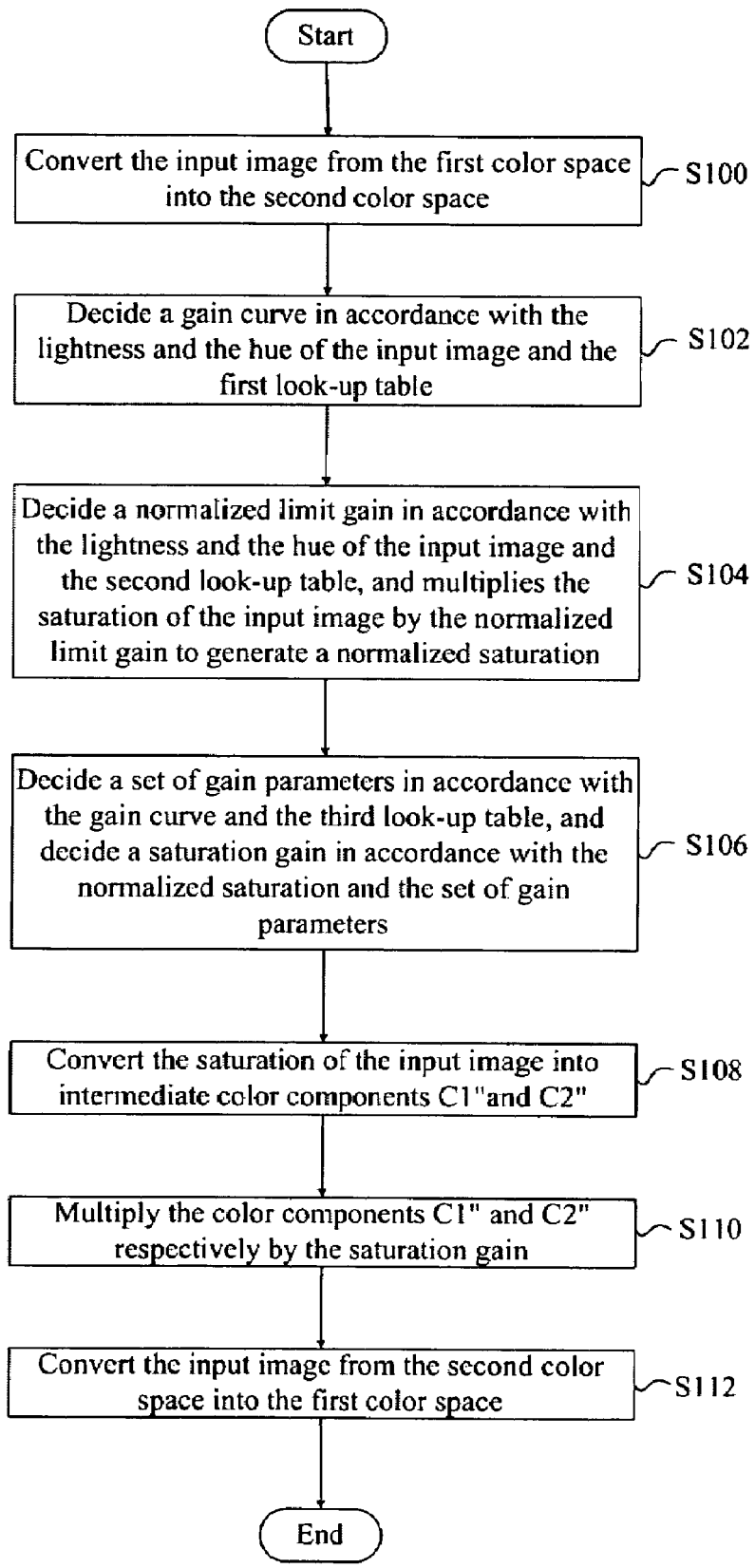
FIG. 12 is a flowchart of an image processing method according to a preferred embodiment of the invention.

Referring to FIG. 12, FIG. 12 is a flowchart of an image processing method according to a preferred embodiment of the invention. Also referring to FIG. 4 through FIG. 11, the image processing method, according to the invention, is used for adjusting the saturation of the input image, and the input image also includes lightness and hue. The image processing method, according to the invention, includes the steps of:

Step S100: Convert the input image 5 from the first color space (such as an RGB color space) into a second color space (such as a YCbCr color space, a Yuv color space, a YIQ color space, a CIELab color space, or an Luv color space);

Step S102: Decide the gain curve (GC) in accordance with the lightness (L) and the hue (H) of the input image 5 and the first look-up table 400;

Step S104: Decide the normalized limit gain LG_nor in accordance with the lightness (L) and the hue (H) of the input image 5 and the second look-up table 420, and multiply the saturation (S) of the input image 5 by the normalized limit gain LG_nor to generate the normalized saturation S_nor;

Step S106: Decide a set of gain parameters in accordance with the gain curve (GC) and the third look-up table 440, and further decide the saturation gain S_gain in accordance with the normalized saturation S_nor and the set of gain parameters;

Step S108: Convert the saturation (S) of the input image 5 into the intermediate color components (C1") and (C2");

Step S110: Multiply the intermediate color components (C1") and (C2") respectively by the saturation gain S_gain to obtain the adjusted color components (C1') and (C2');

Step S112: Convert the input image 5 from the second color space into the first color space.

In another preferred embodiment, the saturation (S) of the input image 5 can first be multiplied by the saturation gain S_gain, and then the adjusted saturation is converted into the adjusted color components (C1') and (C2').

Compared with prior art, the image processing apparatus and method of the same according to the invention adjusts the saturation of an input image in accordance with the lightness and the hue of the input image simultaneously, to increase the color saturation of the input image to obtain better image quality. Furthermore, the image processing apparatus and the method of the same according to the invention can further prevent hue deviations during the process of image adjustment, so as to further improve the image quality.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An image processing apparatus for adjusting a saturation of an input image, the input image also comprising a lightness and a hue, said apparatus comprising:
    a first processing unit, storing a first look-up table, for deciding a gain curve in accordance with the lightness and the hue of the input image and the first look-up table;
    a second processing unit, storing a second look-up table, for deciding a normalized limit gain in accordance with the lightness and the hue of the input image and the second look-up table and for multiplying the saturation of the input image by the normalized limit gain to generate a normalized saturation;
    a third processing unit, coupled to the first processing unit and the second processing unit respectively and storing a third look-up table, for deciding a set of gain parameters in accordance with the gain curve and the third look-up table and for deciding a saturation gain in accordance with the normalized saturation and the set of gain parameters; and
    a first converter for adjusting the saturation of the input image in accordance with the saturation gain.

2. The apparatus of claim 1, wherein the first look-up table records a plurality of lightness, a plurality of hues, and a plurality of gain curves which each respectively corresponds to one of the lightness and one of the hues.

3. The apparatus of claim 1, wherein the second look-up table records a plurality of lightness, a plurality of hues, and a plurality of normalized limit gains which each respectively corresponds to one of the lightness and one of the hues.

4. The apparatus of claim 3, wherein each of the normalized limit gains LG_nor is respectively calculated using the following formula:

$$LG\_nor = \frac{SV}{S\_limit};$$

wherein SV represents a sampling value associated with the gain curve, and S_limit represents a saturation limit value obtained based on a specific lightness and a specific hue.

5. The apparatus of claim 1, wherein the third look-up table records a plurality of gain curves and a plurality of sets of gain parameters which each respectively corresponds to one of the gain curves.

6. The apparatus of claim 5, wherein each set of gain parameters respectively comprises a first gain $G_1$, a second gain $G_2$, and a third gain $G_3$, and the saturation gain S_gain is calculated using the following formula:

$$S\_gain = \frac{S\_out}{S\_nor};$$

$$S\_out = S_1 * G_1 + S_2 * G_2 + S_3 * G_3; \text{ and}$$

-continued $$\begin{cases} S\_nor \leq T_1 \Rightarrow S_1 = S\_nor & S_2 = 0 & S_3 = 0 \\ T_1 < S\_nor \leq T_2 \Rightarrow S_1 = T_1 & S_2 = S\_nor - T_1 & S_3 = 0 \\ S\_nor > T_2 \Rightarrow S_1 = T_1 & S_2 = T_2 - T_1 & S_3 = S\_nor - T_2 \end{cases};$$

wherein S_nor represents the normalized saturation; $T_1$ represents a first threshold, and $T_2$ represents a second threshold.

7. The apparatus of claim 5, wherein each of the gain curves is respectively a polynomial function; each set of gain parameters respectively comprises n+1 coefficients, and the saturation gain S_gain is calculated using the following formula:

$$S\_gain = \frac{S\_out}{S\_nor}; \text{ and}$$

$$S\_out = G_0 + G_1 * S + G_2 * S^2 + \ldots + G_n * S^n;$$

wherein S_nor represents the normalized saturation; S represents the saturation of the input image, and $G_0$~$G_n$ represent the n+1 coefficients.

8. The apparatus of claim 5, wherein each of the gain curves is respectively an exponential function; each set of gain parameters respectively comprises a base number and an exponent, and the saturation gain S_gain is calculated using the following formula:

$$S\_gain = \frac{S\_out}{S\_nor}; \text{ and}$$

$$S\_out = a^{G_0};$$

wherein S_nor represents the normalized saturation; α represents the base number, and $G_0$ represents the exponent.

9. The apparatus of claim 1, further comprising a second converter coupled to the first processing unit, the input image being in compliance with a first color space, the second converter being used for converting the input image from the first color space into a second color space, wherein the second color space defines a lightness component L and two color components (C1) and (C2).

10. The apparatus of claim 9, wherein the first color space is RGB color space.

11. The apparatus of claim 9, wherein the second color space is one selected from a group consisting of a YCbCr color space, a Yuv color space, a YIQ color space, a CIELab color space, and an Luv color space.

12. The apparatus of claim 9, further comprising a third converter respectively coupled to the second converter, the first processing unit, and the second processing unit, the third converter being used for converting the two color components (C1) and (C2) into the hue (H), wherein the hue (H) is defined as follows:

$$H = \tan^{-1}\left(\frac{C1}{C2}\right).$$

13. The apparatus of claim 9, further comprising a fourth converter respectively coupled to the first converter, the second converter, and the second processing unit, the fourth converter being used for converting the color components (C1) and (C2) into the saturation (S), wherein the saturation (S) is defined as follows:

$$S = \sqrt{C1^2 + C2^2}.$$

14. The apparatus of claim 13, further comprising a fifth converter respectively coupled to the first converter and the second converter, the fifth converter being used for converting the input image from the second color space into the first color space.

15. The apparatus of claim 9, wherein the first converter converts the saturation into the two intermediate color components (C1") and (C2") and respectively multiplies the two intermediate color components (C1''') and (C2''')by the saturation gain to obtain the two adjusted color components (C1') and (C2').

16. An image processing method for adjusting a saturation of an input image, the input image also comprising a lightness and a hue, said method comprising the steps of:
(a) deciding a gain curve in accordance with the lightness and the hue of the input image and a first look-up table;
(b) deciding a normalized limit gain in accordance with the lightness and the hue of the input image and a second look-up table, and multiplying the saturation of the input image by the normalized limit gain to generate a normalized saturation;
(c) deciding a set of gain parameters in accordance with the gain curve and a third look-up table, and deciding a saturation gain in accordance with the normalized saturation and the set of gain parameters; and
(d) adjusting the saturation of the input image in accordance with the saturation gain.

17. The method of claim 16, wherein the first look-up table records a plurality of lightness, a plurality of hues, and a plurality of gain curves which each respectively corresponds to one of the lightness and one of the hues.

18. The method of claim 16, wherein the second look-up table records a plurality of lightness, a plurality of hues, and a plurality of normalized limit gains which each respectively corresponds to one of the lightness and one of the hues.

19. The method of claim 18, wherein each of the normalized limit gains LG_nor is respectively calculated using the following formula:

$$LG\_nor = \frac{SV}{S\_limit};$$

wherein SV represents a sampling value associated with the gain curve, and S_limit represents a saturation limit value obtained based on a specific lightness and a specific hue.

20. The method of claim 16, wherein the third look-up table records a plurality of gain curves and a plurality of sets of gain parameters which each respectively corresponds to one of the gain curves.

21. The method of claim 20, wherein each set of gain parameters respectively comprises a first gain $G_1$, a second gain $G_2$, and a third gain $G_3$, and the saturation gain S_gain is calculated using the following formula:

$$S\_gain = \frac{S\_out}{S\_nor};$$

$$S\_out = S_1 * G_1 + S_2 * G_2 + S_3 * G_3; \text{ and}$$

$$\begin{cases} S\_nor \leq T_1 \Rightarrow S_1 = S\_nor & S_2 = 0 & S_3 = 0 \\ T_1 < S\_nor \leq T_2 \Rightarrow S_1 = T_1 & S_2 = S\_nor - T_1 & S_3 = 0 \\ S\_nor > T_2 \Rightarrow S_1 = T_1 & S_2 = T_2 - T_1 & S_3 = S\_nor - T_2 \end{cases};$$

wherein S_nor represents the normalized saturation; $T_1$ represents a first threshold, and $T_2$ represents a second threshold.

22. The method of claim 20, wherein each of the gain curves is respectively, a polynomial function; each set of gain parameters respectively comprises n+1 coefficients, and the saturation gain S_gain is calculated using the following formula:

$$S\_gain = \frac{S\_out}{S\_nor}; \text{ and}$$

$$S\_out = G_0 + G_1 * S + G_2 * S^2 + \ldots + G_n * S^n;$$

wherein S_nor represents the normalized saturation; S represents the saturation of the input image, and $G_0 \sim G_n$ represent the n+1 coefficients.

23. The method of claim 20, wherein each of the gain curves is respectively an exponential function; each set of gain parameters respectively comprises a base number and an exponent, and the saturation gain S_gain is calculated using the following formula:

$$S\_gain = \frac{S\_out}{S\_nor}; \text{ and}$$

$$S\_out = a^{G_0};$$

wherein S_nor represents the normalized saturation; $\alpha$ represents the base number, and $G_0$ represents the exponent.

24. The method of claim 16, further comprising the steps of:
converting the input image from a first color space into a second color space prior to the step (a), wherein the second color space defines a lightness component L and two color components (C1) and (C2).

25. The method of claim 24, wherein the first color space is an RGB color space.

26. The method of claim 24, wherein the second color space is one selected from a group consisting of a YCbCr color space, a Yuv color space, a YIQ color space, a CIELab color space, and an Luv color space.

27. The method of claim 24, wherein in accordance with the two color components (C1) and (C2), the hue (H) is defined as follows:

$$H = \tan^{-1}\left(\frac{C1}{C2}\right).$$

28. The method of claim 24, wherein in accordance with the two color components (C1) and (C2), the saturation (S) is defined as follows:

$$S = \sqrt{C1^2 + C2^2}.$$

29. The method of claim 24, wherein the step (d) further comprises the steps of:
(d1) converting the saturation into the two intermediate color components (C1") and (C2"); and
(d2) multiplying the two intermediate color components (C1''') and (C2''') respectively by the saturation gain to obtain the two adjusted color components (C1') and (C2').

30. The method of claim 29, further comprising the steps of:
(e) converting the input image from the second color space into the first color space.

* * * * *

UNITED STATES PATENT AND TRADEMARK OFFICE
CERTIFICATE OF CORRECTION

PATENT NO. : 7,764,399 B2  Page 1 of 1
APPLICATION NO. : 11/595661
DATED : July 27, 2010
INVENTOR(S) : Lee et al.

It is certified that error appears in the above-identified patent and that said Letters Patent is hereby corrected as shown below:

Title Page item (75)
Please change the spelling of the second-listed inventor's name to "Yun-Cheng Liu".

Signed and Sealed this

Twelfth Day of October, 2010

David J. Kappos
*Director of the United States Patent and Trademark Office*